US006587467B1

(12) United States Patent
Morgenstern et al.

(10) Patent No.: US 6,587,467 B1
(45) Date of Patent: Jul. 1, 2003

(54) VIRTUAL CHANNEL MULTICAST UTILIZING VIRTUAL PATH TUNNELING IN ASYNCHRONOUS MODE TRANSFER NETWORKS

(75) Inventors: Meir Morgenstern, Or Yehuda (IL); David Margulis, Haifa (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/433,536

(22) Filed: Nov. 3, 1999

(51) Int. Cl.[7] .......................... H04L 12/28; H04L 12/56
(52) U.S. Cl. ....................... 370/399; 370/409
(58) Field of Search ............................ 370/399, 397, 370/420, 392, 94.1, 339

(56) References Cited

U.S. PATENT DOCUMENTS

| 5,179,556 | A | * | 1/1993 | Turner ......................... 370/233 |
| 5,818,842 | A | * | 10/1998 | Burwell et al. ............. 370/250 |
| 6,091,725 | A | * | 7/2000 | Cheriton et al. ............ 370/392 |
| 6,097,726 | A | * | 8/2000 | Puntambekar et al. ...... 370/397 |
| 6,148,000 | A | * | 11/2000 | Feldman et al. ............. 370/394 |
| 6,148,001 | A | * | 11/2000 | Soirinsuo et al. ......... 370/236.2 |

OTHER PUBLICATIONS

ATM Forum 95–1434R9, UNI Signaling Specification, 4.0, 1995, pp. 86–88.
ATM Practical Implementations Here and now, 3COM Corporation, 1996.
CISCO IOS Switching Services Configuration Guide, Lan Emulation Overview, pp. XC–59–65.
LAN Emulation Over ATM Version 2–LUNI Specification–Letter Ballot, AF–LANE–0084.000, pp. 25–26, 29–33, 88–101.
LAN Emulation Over ATM, 1996, pp. 1–11.

* cited by examiner

Primary Examiner—Wellington Chin
Assistant Examiner—Jamal A. Fox
(74) Attorney, Agent, or Firm—Howard Zaretsky; Paul J. Sutton

(57) ABSTRACT

VC multicast implementation scheme utilizing VP tunneling over public ATM VP switched networks utilizing P2P and P2M connections to provide VC multicast capability to the attached private ATM networks. The border ATM VC switch in each private ATM network is connected to the ATM VP switch in the public ATM network via a physical interface adapted to carry one or more P2P VP tunnels. A P2P VP tunnel is established from each VC switch to all other VC switches connected to the public ATM network. A dedicated P2M VP tunnel is established between the source VC switch to each of the destination VC switches connected to the public ATM network. For each multicast connection to be established, a VPI/VCI value pair is allocated over the dedicated P2M VP tunnel used to transmit data associated with all P2M calls for all the P2P VP tunnels carried by the physical interface.

4 Claims, 6 Drawing Sheets

VIRTUAL CHANNEL MULTICAST UTILIZING VIRTUAL PATH TUNNELING IN ASYNCHRONOUS MODE TRANSFER NETWORKS

FIELD OF THE INVENTION

The present invention relates generally to data communications networks and more particularly relates to an apparatus for and a method of providing VP multicasting in an Asynchronous Transfer Mode (ATM) network utilizing VP tunneling.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in the Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment a level of multi-vendor interoperability.

LAN Emulation

Today, most data traffic in existing customer premise networks travels over legacy LANs. It is desirable to permit these legacy LANs and their embedded infrastructure to operate with new ATM networks currently being deployed. To enable an easier migration path to ATM, the ATM Forum has defined LAN Emulation (LANE) specification that allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Emulation over ATM networks, the LANE Version 1.0 standard drafted by the ATM Forum and incorporated herein by reference, defines the LANE architecture and a set of protocols used by the LANE entities. LANE uses a client/server model to provide its services.

The entities defined by the LANE architecture include LAN Emulation Clients (LECs), a LAN Emulation Server (LES), a Broadcast and Unknown Server (BUS) and LAN Emulation Configuration Server (LECS). The LES, BUS and LECS constitute what is known to as the LANE Service.

Each LAN Emulation Client (LEC) represents a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC must first communicate with an LECS. It may utilize a specific ATM address of the LECS if it knows it, or, as is typically the case, may use the well known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LANE BUS is responsible for the distribution of the Broadcast, Multicast and unknown traffic to the LECs that is typically sent by a LEC before the ATM address has been resolved. Note that a given BUS serves only one emulated LAN.

The LECS contains the database used in determining which emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LECs physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down. The protocol the LECs use to communicate with each other and to the LAN Emulation services is known as LAN Emulation User to Network Interface (LUNI).

A characteristic feature of these types of implementations, however, is that when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECs, LESs, BUSs, etc. In addition, LNNI defines a new LAN Emulation Service entity, i.e., the Selective Multicast Server (SMS), to enhance the handling of Multicast traffic.

The relationship between LEC, LECS, LES, BUS and SMS entities in prior art Version 2.0 LAN Emulation services includes LECs in communication with each other and to other LECs, LESs and BUSs. In addition, both LECs and the LECS, LES and BUS communicate with a Selective Multicast Server (SMS) entity. Note that there can be more than one SMS per ELAN.

Note that in connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are re-assigned by the LECS to other active LESs.

In the draft Version 2.0 of the LANE standard, the services include having multiple LECSs with each LECS having multiple ELANs. The LECs (clients) are apportioned across the LESs. Redundancy is handled by defining several LESs for the same ELAN, i.e., LES #1, LES #2, etc.

As described above, in the LANE Version 1.0 architecture, the BUS is responsible for handling three type of traffic: broadcast, multicast and unknown unicast. The multicast traffic is generated by one or more applications that send their data to a group of receivers. The group of receivers does not include all the clients of the ELAN. For example, these applications include but are not limited to video broadcasting, distribution of data information, e.g., software distribution or push technology, video conferencing, remote learning, etc.

It is expected that these applications will increase in popularity in the near future. Therefore, the amount of multicast traffic is expected to also increase to a large extent. If multicast traffic were to grow, based on the LANE Version 1.0 implementation, the BUS would quickly become a bottleneck for traffic when the total amount of multicast traffic on the ELAN exceeds the forwarding power of the BUS.

Note that it is expected that in the near future Multicast traffic will become very heavy in networks. Broadcast traffic occurs mainly in the startup phase of the network and network elements. Once operating, little continuous broadcast traffic is generated. Similarly, unknown traffic is also not generated on a continuous basis. Unknown traffic is generated, for example, by a network element before a direct connection is established between two network devices.

In addition, multicast traffic is currently handled as broadcast traffic. All multicast traffic defaults to the BUS (to the LES for unicast traffic). In other words, regardless of the size and membership of the multicast group, a multicast message is broadcast to all the LECs and all members attached to the LECs.

A standard prior art SMS is constructed to perform the following functions. SMSs are designed to forward traffic on a packet level as opposed to forwarding traffic on a cell level. SMSs utilize a heavy protocol known as Server Cache Synchronization Protocol (SCSP). In LNNI most of the information between entities, i.e., LES, SMS, LECS, is transferred using this protocol. This protocol is needed to enable the SMS and LES to reside on difference network devices. In addition, SMSs introduce themselves to the LECS and after obtaining the LES(s) from the LECS. After this first introduction they introduce themselves again to the LES(s) themselves. Further, SMSs must forward multicast traffic to the BUS to ensure backward compatibility with non-SMS enabled LECs.

Initially, the LEC requests the LES for a destination for sending multicast traffic. The LES responds with the address of an SMS. The SMS maintains a list of Multicast Media Access Control (MMAC) addresses, wherein each MMAC represents a multicast group. It is possible that several SMSs serve the same MMAC so as to provide load balancing in the event the output demand exceeds any one SMS.

The LESs have knowledge of the locations of the SMSs and the MMACs handled by each. When an LE_ARP_REQ message arrives at a LES from a LEC for a particular MMAC, the LES replies with the ATM address of the LES. If the LES does know about any SMSs, it sends the LEC the ATM address of the BUS. Thus, the BUS is the default in the event an SMS cannot be assigned.

In a network with multicast, the sending and receiving functions are independent of each other. In other words, multicast connections may involve overlapping LECs or may involve totally non overlapping LECs. The same LEC may function as a sender and a receiver for a single multicast connection or for multiple multicast connections.

Once the LEC obtains the ATM address of the SMS, it establishes a point to point connection to the SMS. The LEC then sends multicast traffic to the SMS over that connection. For listening, the LEC issues an LE_REGISTER_REQ message for a particular MMAC and sends it to the LES. The LES, using the LNNI SCSP protocol, instructs the SMS to add the LEC to the point to multipoint connection.

It is important to note that the LAN Emulation processes that execute in the network require the establishment of numerous connections between the various LANE entities. These connections comprise numerous unicast and multicast connections. The multicast connections function to distribute data from a single sending entity to multiple receiving entities. Multicast connections are constructed from point to multipoint (P2M) connections.

In private networks, point to multipoint connections are easily created. A problem, however, arises in public networks. Public ATM networks are used, for example, to connect two or more private networks. The mechanism used to connect private networks through a public network is Virtual Path (VP) tunneling.

VP Tunneling

VP tunneling is supported on many ATM switches currently in use. VP tunneling is primarily used to provision 'virtual trunks' over a public ATM network infrastructure. Once these virtual trunks are established, they are used in the same fashion as physical trunks to carry user traffic and inter-switch signaling traffic. Some example applications include: (1) Network Service Providers (NSPs) operating public ATM networks that wish to offer transparent LAN services; (2) private enterprise customers operating geographically dispersed private ATM campus backbone networks that need to be interconnected using a public ATM network infrastructure, i.e., Virtual Private Networks (VPNs); and (3) Network Service Providers that wish to offer high speed access services, e.g., xDSL, utilizing a VP tunneling enabled ATM switch as an aggregation point into their public ATM network.

A block diagram illustrating an example Virtual Private Network comprising three private ATM networks connected via a public ATM network infrastructure is shown in FIG. 1. The network, generally referenced 10, comprises a plurality of private ATM networks 12 labeled private ATM network #1 through #3 connected via a public ATM network 16. The private ATM networks are typically constructed from VC switches while the public ATM switch typically is constructed from VP switches. The border or edge VC switch 14 in each private network is connected to the border VP switch 18, i.e., the access switch, in the public network 16 via a single physical connection 20.

The switches in the private networks are connected via a physical line operating at T3, E3, OC-3, etc. to the ATM switch in the nearest Central Office (CO) to form the physical network. Virtual Paths are provisioned to form the virtual network topology between the CPEs, i.e., the private ATM networks. The network shown in FIG. 2 shows the Virtual Private Network 40 constructed utilizing VP tunneling and connected via a public ATM network infrastructure 46. The border VC switches 44, 56, 58 in private ATM networks 42, labeled, private ATM network #1 through #3, are connected to a border VP switch 48 in the public ATM network 46 via a single physical line 45. Each of the three private networks is connected to the other two using Permanent Virtual Paths (PVPs) 50, 52, 54 having VPI endpoints A and B, E and F, and C and D, respectively.

Over the PVPs are created what are known as virtual UNIs. A standard UNI 30 connection can be defined as an interface point between ATM end users and a private ATM switch wherein the protocol and physical specifications are per ATM Forum UNI standards. A key feature of UNI connection is that is includes a single signaling channel.

A Virtual UNI, on the other hand, supports multiple signaling/ILMI channels on a single UNI. This effectively creates multiple virtual UNIs. Each virtual UNI comprises a unique VPI value. On each virtual UNI, signaling messages use VPI='X', VCI=5, ILMI messages use VPI='X', VCI=16 while PNNI messages use VPI='X', VCI=18. End to end control messages, i.e., signaling, ILMI, etc. are exchanged between peers. All the SVCs managed by a particular virtual UNI share the same VPI value that is equivalent to the VPI of the virtual UNI.

A block diagram illustrating the Virtual UNI protocol structure is shown in FIG. 3. The protocol stack 30 comprises the physical layer 32 at the bottom, ATM layer 34 followed by one or more virtual UNIs 36 labeled virtual UNI #1 through #N. The control layer 38 is on top of the virtual UNI layer and includes the signaling, ILMI, PNNI, etc. protocols. Note that each virtual UNI represents a separate VP tunnel and has a different VPI value, each VPI being mapped to a different destination.

The ability to create virtual UNIs enables applications such as (1) connecting multiple end systems through a VP Multiplexor to a single port of an ATM switch and (2) connecting WAN access devices using the VP switching, i.e., cross-connecting, capability of the WAN.

With reference to FIG. 2, VP tunneling (as defined by the ATM Forum) provides a mechanism to connect several VC switches through a backbone of VP switches. The VC switches use several virtual UNIs on the physical line interface attached to the VP switch whereas the VP switch uses PVPs to connect virtual UNIs belonging to two different VC switches. Thus, an individual VP tunnel comprises two virtual UNIs at the VC switches (one associated with each VC switch) connected through a PVP configured in and routed through the VP network. The number of virtual UNIs in the VC switch equals the number of remote VC switches that particular VC switch is connected to. In this example, each VC switch maintains two virtual UNIs, i.e., VP tunnels, one for each of the other two VC switches.

In the typical application, Virtual LANs are configured between the three private ATM sites. The public ATM network functions as a private line replacement providing virtual trunks between the private networks. Without VP tunneling, the network shown has a limitation in that a separate physical line interface must be used for each virtual path (i.e., destination). Therefore, a separate access line from the customer premise to the central office is required. This, however, is not practical since the most costly leg of a leased line is the local loop. VP tunneling is therefore used since it provides support for multiple virtual paths/virtual destinations on the same physical port.

In the absence of VP tunneling, one solution to providing connectivity for LAN Emulation, e.g., LEC to BUS and LEC to LES connections, is to utilize a single PVC rather than multiple SVCs. This, however, is not practical to implement with AAL5 traffic since there is no mechanism to map multiple SVCs to one PVC.

Another solution is to utilize a PVC in place of each SVC. Utilizing multiple PVCs is also not practical since it is difficult or impossible from a configuration standpoint to determine a priori all the connections that need to be created since a PVC is a permanent connection.

The use of VP tunneling utilizes PVPs instead of a myriad of PVCs. SVCs can be created within the PVP pipe without concern for routing as the routing for the PVP is already configured.

In connection with public ATM networks, the problem is that the VP switch backbone in the public network rarely supports signaling. Signaling over public networks is not usually provided because of several reasons: (1) the network is made more complex, (2) the issue of security, (3) the requirement of billing, etc. Thus, public networks typically limit the services they provide.

VP tunneling reduces the number of physical interfaces required to establish a particular network topology between VC switches attached to the public network. VP tunneling should therefore support both VC and VP unicast and multicast traffic. VP multicast capability is needed in order to fully support VP tunneling service. This, however, requires the border VC switch in each private network to replicate the same cell such that each copy is assigned a different VPI value wherein each VPI value is associated with a different virtual UNI. In addition, the cell replication must occur on the same physical link. Very few ATM switches currently have this capability. Most switches do not have the ability to perform replication of a cell on the same port. Replication can only be done on different ports. In a VPN environment, VP multicasting requires the same cell to be replicated to different VPI values (i.e., different virtual UNIs) all on the same physical line. This capability is termed 'per interface VC multicast.'

One solution is to replicate the cell in software in the event the VC switch fabric does not support 'per interface VC 'multicast.' As the number of parties in the call increases, the multicast traffic throughput decreases until it drops low below the minimum throughput required. For example, in the LANE environment, a multicast traffic throughput on the order of 50 Mbps is required. Such a high throughput rate would be difficult to maintain using software VC multicasting.

Thus there is a need for a mechanism that can provide VC multicasting capability over a public VP switch backbone network utilizing VP tunneling.

SUMMARY OF THE INVENTION

The present invention solves the problems associated with the prior art by providing an apparatus for and a method of implementing VC multicast utilizing VP tunneling over public ATM VP switched networks. The invention utilizes P2P and P2M connections to provide VC multicast capability to the attached private ATM networks. The border ATM VC switch in each private ATM network is connected to the ATM VP switch in the public ATM network via a physical interface adapted to carry one or more point to point (P2P) VP tunnels wherein each tunnel is distinguished by a different VPI value. Each P2P tunnel implements the functionality of a virtual UNI. A P2P VP tunnel is established from each VC switch to each of the other VC switches connected to the public ATM network In addition to the P2P VP tunnels, a dedicated point to multipoint (P2M) VP tunnel is established and configured between the VC switch, i.e., the source, originating the multicast traffic to each of the other VC switches, i.e., all other destinations, connected to the public ATM network. The P2M VP tunnel is assigned a unique VPI value that is different from the VPI values used by the P2P VP tunnels.

For each multicast connection to be established, a VPI/VCI value pair is allocated over the dedicated P2M VP tunnel. This VPI/VCI pair on the P2M VP tunnel is used to transmit the data associated with the multicast call. The P2M tunnel is used to transmit data associated with all P2M calls for all the P2P VP tunnels carried by the physical interface. Note that no control layer messages are exchanged over the P2M VP tunnel.

The allocation of VPI/VCI pairs is performed in a centralized manner such that the VPI value assigned is equal to the corresponding VPI of the P2M VP tunnel and the VCI is allocated from a shared pool of available VCI values for all P2P tunnels.

In accordance with the present invention, all multicast traffic is received by all destination VC ATM switches since it is not possible to define a subset of sites for the multicast traffic. Therefore, each VC ATM switch is operative to filter out the non-relevant multicast traffic received over the physical interface attached to the ATM VP switch in the public network.

It is important to note that the present invention makes the assumption that the ATM VP switching fabric in the public ATM network is capable of supporting both P2P PVP calls and P2M PVP calls, i.e., VP multicast calls. The present invention requires that these two capabilities to be present in the public ATM network.

There is provided in accordance with the present invention, in an Asynchronous Transfer Mode (ATM) network, a method of establishing multicast connections from a multicast source Virtual Circuit (VC) switch to a plurality of multicast destination VC switches, the source VC switch and the plurality of destination VC switches connected to a public ATM Virtual Path (VP) switched network, the method comprising the steps of establishing a plurality of point to point (P2P) permanent virtual path (PVP) tunnels, a separate P2P PVP tunnel established from the multicast source VC switch to each multicast destination VC switch, each P2P PVP tunnel being assigned a unique VPI value, establishing a point to multipoint (P2M) PVP tunnel between the multicast source VC switch and each multicast destination VC switch, the P2M PVP tunnel assigned a unique VPI value different from VPI values assigned to the plurality of P2P tunnels, assigning a VPI/VCI value to each multicast call to be established wherein the VPI value corresponds to the VPI value assigned to the P2M PVP tunnel, the VCI value assigned being unique for all multicast calls to be carried over the P2M PVP tunnel, registering each multicast call with one or more multicast destination VC switches intended to be included in the multicast call and transmitting multicast traffic of all P2M calls carried by the physical interface associated therewith from the multicast source VC switch via the P2M PVP tunnel, filtering multicast cells at each multicast destination VC switch in accordance with multicast calls previously registered therewith.

The P2M PVP tunnel is adapted to carry only multicast traffic and no signaling or control messages. The step of assigning comprises assigning VCI values from a shared pool of available VCI values. The step of registering comprises the exchange of signaling messages between the multicast source VC switch and each multicast destination VC switch over the public VP switched network.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ARP | Address resolution Protocol |
| ATM | Asynchronous Transfer Mode |
| BUS | Broadcast and Unknown Server |
| CCITT | Comite Consulatif International Telegraphique et Telephonique |
| ELAN | Emulated Local Area Network |
| FDDI | Fiber Distributed Data Interface |
| IETF | Internet Engineering Task Force |
| IISP | Interim Inter-Switch Signaling Protocol |
| ILMI | Integrated Local Management Interface |
| IP | Internet Protocol |
| IPX | Internetwork Packet Exchange |
| ITU | International Telecommunications Union |
| LAN | Local Area Network |
| LANE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MMAC | Multicast Media Access Control |
| OS | Operating System |
| P2M | Point-to-Multipoint |
| PNNI | Private Network to Network Interface |
| PVC | Permanent Virtual Circuit |
| SAR | Segmentation and Reassembly |
| SCSP | Server Cache Synchronization Protocol |
| SMS | Selective Multicast Server |
| SVC | Switched Virtual Circuit |
| TLV | Type, Length, Value |
| UNI | User to Network interface |
| VCC | Virtual Channel Connection |
| VCI | Virtual Circuit Identifier |
| VPI | Virtual Path Identifier |

Figure 1:
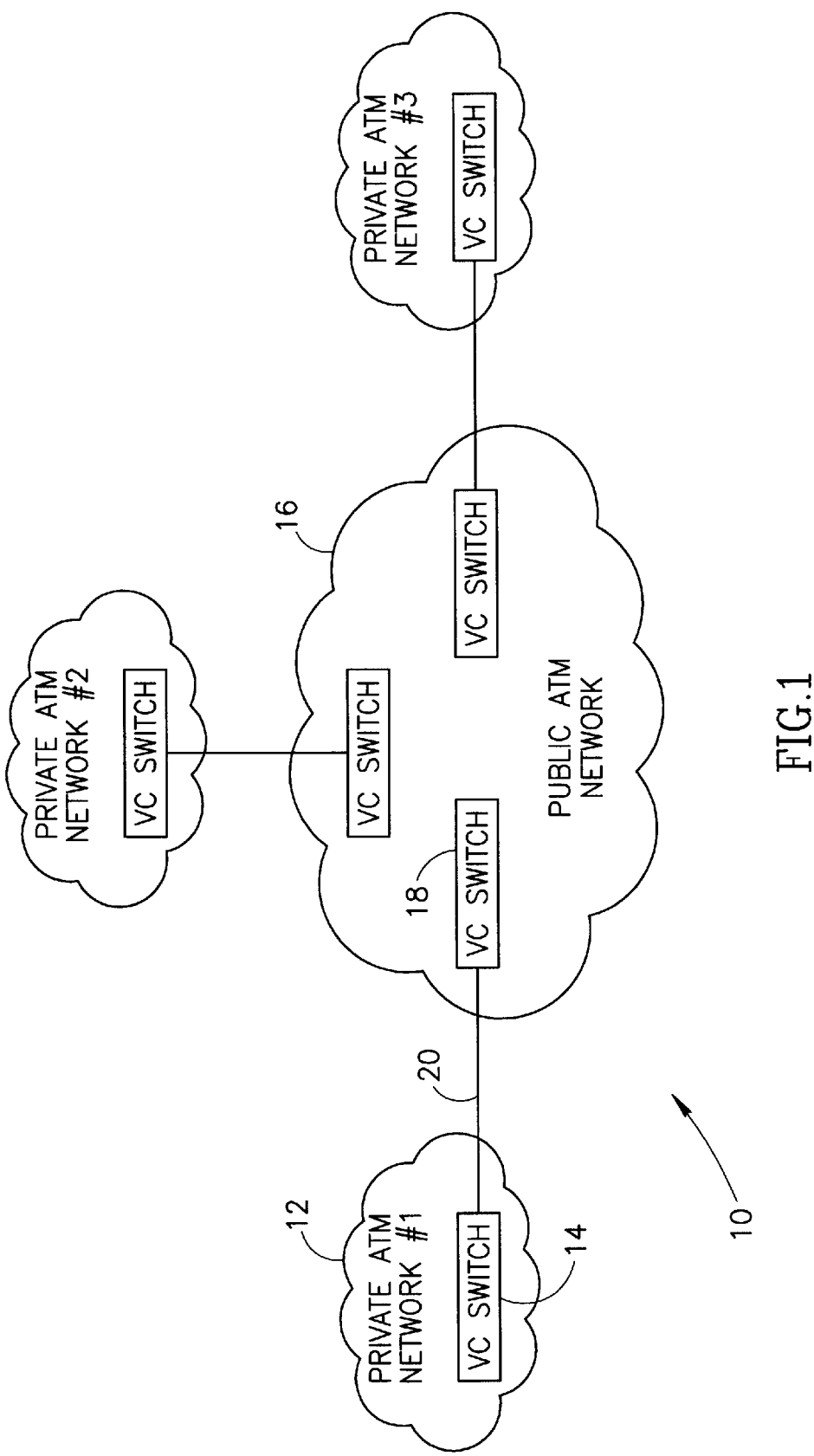
FIG. 1 is a block diagram illustrating an example Virtual Private Network comprising three private ATM networks connected via a public ATM network infrastructure.
Figure 2:
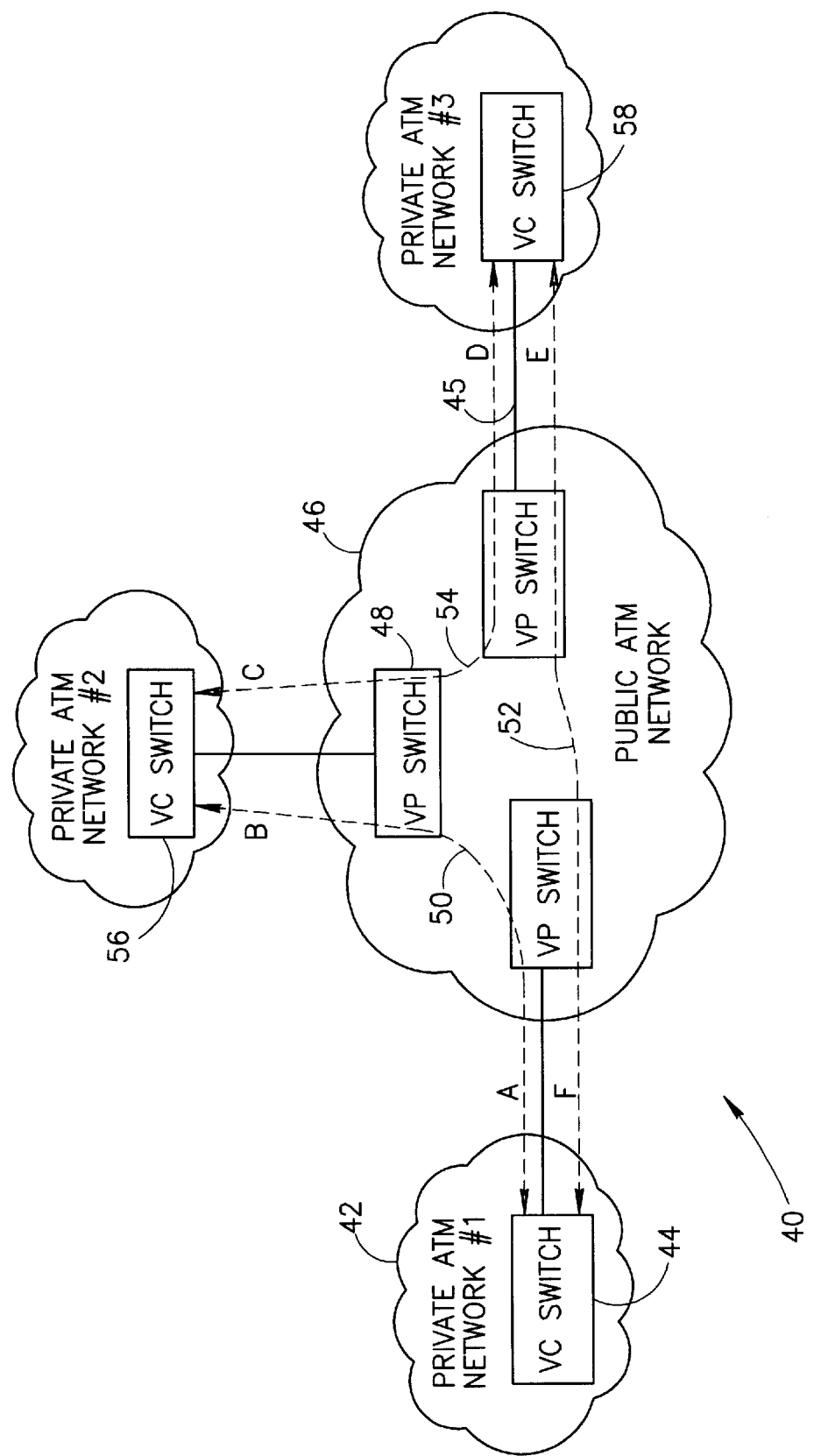
FIG. 2 is a block diagram illustrating an example Virtual Private Network constructed utilizing VP tunneling and connected via a public ATM network infrastructure.
Figure 3:
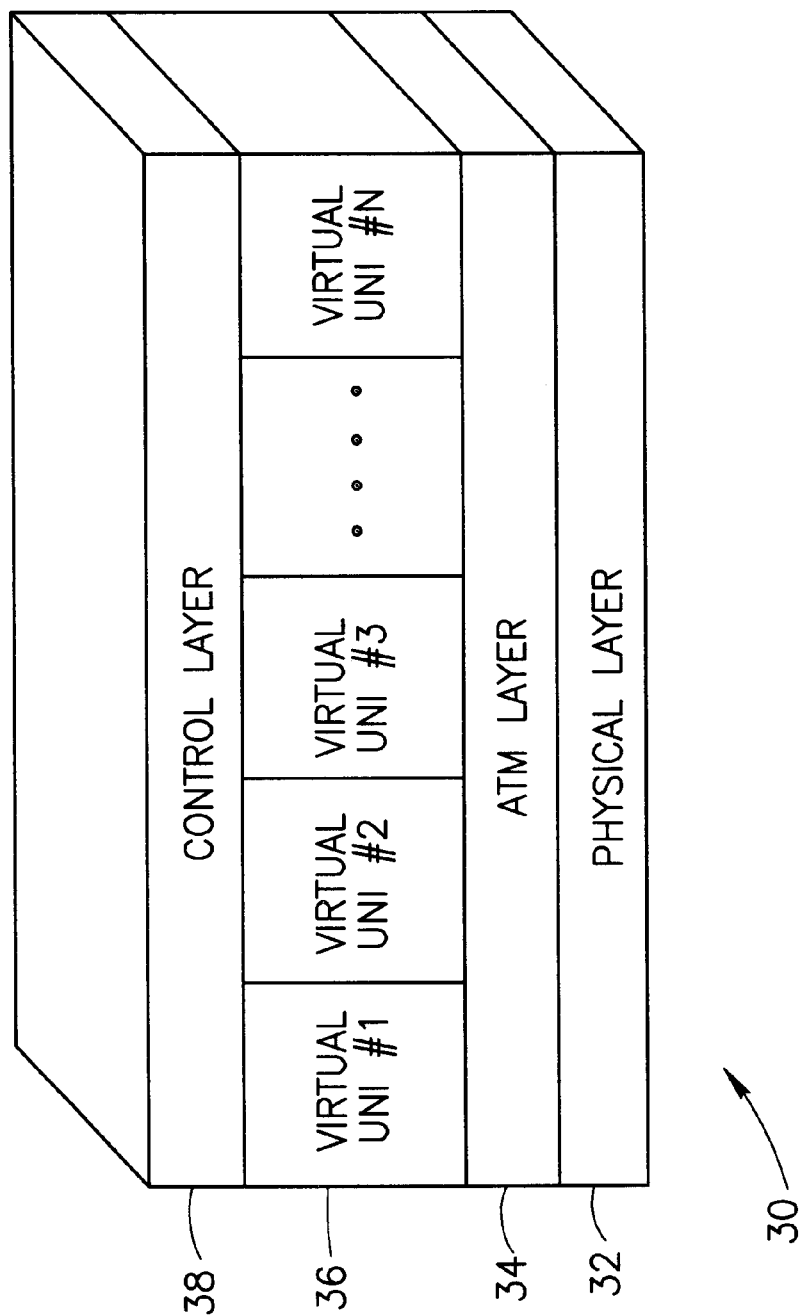
FIG. 3 is a block diagram illustrating the Virtual UNI protocol structure.

The following definitions apply throughout this document. The term VC denotes a communications channel that provides for the sequential unidirectional transport of ATM cells. The term VP denotes a unidirectional logical association or bundle of VCs. The term VC switch denotes a network element that connects VCs together. It functions to translate both VPI and VCI values and is directed by the control layer 38 (FIG. 3) to relay the cells belonging to a VC. This is illustrated in Table 1 below.

TABLE 1

| | | VC Switching | | | |
| --- | --- | --- | --- | --- | --- |
| Port-In | VPI-In | VCI-In | Port-Out | VPI-Out | VCI-Out |
| $X_1$ | $Y_1$ | $Z_1$ | $X_2$ | $Y_2$ | $Z_2$ |

The term VP switch denotes a network element that connects VPs together. It functions to translate VPI (not VCI) values and is directed by the control layer to relay the cells of the VP. This is illustrated in Table 2 below.

TABLE 2

VP Switching

| Port-In | VPI-In | VCI-In | Port-Out | VPI-Out | VCI-Out |
|---------|--------|--------|----------|---------|---------|
| $X_1$ | $Y_1$ | $Z_1$ | $X_2$ | $Y_2$ | $Z_1$ |

The term VP multicast denotes the replication and transmit operations of a single ATM cell by a source interface wherein the ATM cell reaches a group of one or more destinations distinguished by their port and VPI values. This is illustrated in Table 3 below. Note that in this case, the cell replication is performed in the switching fabric.

TABLE 3

VP Multicast

| Port-In | VPI-In | VCI-In | Port-Out | VPI-Out | VCI-Out |
|---------|--------|--------|----------|---------|---------|
| $X_1$ | $Y_1$ | $Z_1$ | $X_2$ | $Y_2$ | $Z_1$ |
|  |  |  | $X_3$ | $Y_3$ | $Z_1$ |

The term VC multicast denotes the replication and transmit operations of a single ATM cell by a source interface wherein the ATM cell reaches a group of one or more destinations distinguished by their port, VCI and VPI values. This is illustrated in Table 4 below.

TABLE 4

VC Multicast

| Port-In | VPI-In | VCI-In | Port-Out | VPI-Out | VCI-Out |
|---------|--------|--------|----------|---------|---------|
| $X_1$ | $Y_1$ | $Z_1$ | $X_2$ | $Y_2$ | $Z_2$ |
|  |  |  | $X_3$ | $Y_3$ | $Z_3$ |

The term 'per interface VC multicast' denotes the replication and transmit operations of a single ATM cell by a source interface wherein the ATM cell reaches a group of one or more destinations distinguished by their VPI value. This is illustrated in Table 5 below.

TABLE 5

Per interface VC Multicast

| Port-In | VPI-In | VCI-In | Port-Out | VPI-Out | VCI-Out |
|---------|--------|--------|----------|---------|---------|
| $X_1$ | $Y_1$ | $Z_1$ | $X_2$ | $Y_2$ | $Z_1$ |
|  |  |  | $X_2$ | $Y_3$ | $Z_1$ |

Note that the only distinguishing feature is the output VPI value which is different for each virtual UNI, i.e., VP tunnel. Note also that, as discussed previously in the Background Section of this document, the majority of ATM switches available today do not have this capability.

P2P and P2M VP Tunnels

Figure 4:
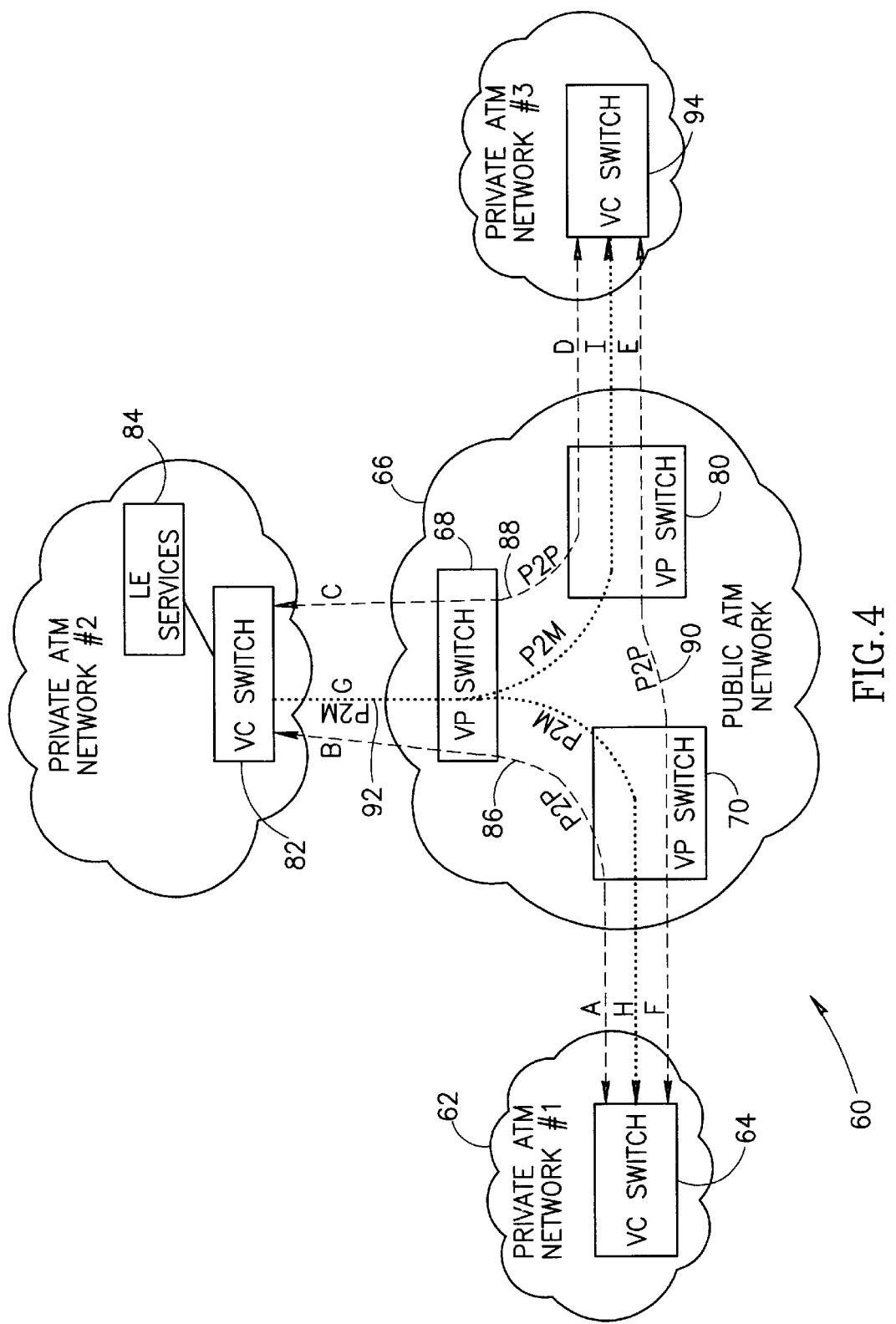
FIG. 4 is a block diagram illustrating a VPN constructed in accordance with the present invention and providing multicast connections between private ATM networks.

The present invention is an apparatus for and a method of establishing VC multicast calls utilizing VP tunneling over public ATM VP switched networks. The invention utilizes P2P and P2M connections to provide VC multicast capability to the attached private ATM networks. A block diagram illustrating a Virtual Private Network (VPN) constructed in accordance with the present invention and providing multicast connections between private ATM networks is shown in FIG. 4. The network, generally referenced 60, is presented to aid in understanding the principles of the present invention. The scope of the invention is not intended to be limited to the example network shown. The invention is applicable to any network wherein it is desired to establish one or more VC multicast connections between private ATM networks connected by physical connections to a public VP switched ATM network.

In accordance with the present invention, the border ATM VC switch in each private ATM network is connected to the ATM VP switch in the public ATM network via a physical interface adapted to carry one or more point to point (P2P) VP tunnels wherein each tunnel is distinguished by a different VPI value. Each P2P tunnel implements the functionality of a virtual UNI. A P2P VP tunnel is established from each VC switch to all other VC switches connected to the public ATM network.

The network, generally referenced 60, comprises a plurality of private ATM networks 62 labeled private ATM network #1 through #3 connected via a public ATM network 66. The private ATM networks #1 through #3 are constructed from VC switches 64, 82, 94, respectively, while the public ATM switch typically is constructed from VP switches (border VP switches 70, 68, 80 are shown). The border or edge VC switch 64, 82, 94 in each private network is connected to the border VP switch 70, 68, 80, respectively, in the public network 66 via a physical connection (not shown).

The physical network is formed by connecting the switches in the private networks via a physical line operating at T3, E3, OC-3, etc. to the ATM VP switch in the nearest Central Office (CO). Virtual Paths are provisioned to form the virtual network topology between the CPEs, i.e., the private ATM networks. The network shown in FIG. 4 shows the network 60 constructed utilizing VP tunneling and connected via a public ATM network infrastructure 66.

For illustration purposes, private ATM network #2 incorporates the LAN Emulation Services block 84 which typically includes the LECS, LEC, LES, BUS and SMS services. For example, each LES and BUS entity in each ELAN is operative to establish a multicast connection to all the LECs in its ELAN. Assuming the ELAN spans across private ATM networks #1, #2 and #3, multicast traffic originated by the LE Services 84 must be routed through the public ATM network to LECs located in private ATM networks #1 and #3.

Each of the three private networks is connected to the other two using Permanent Virtual Paths (PVPs) or tunnels. In particular, P2P PVP 86 connects VC switches 82, 64 via VP switches 68, 70; P2P PVP 88 connects VC switches 82, 94 via VP switches 68, 80; and P2P PVP 90 connects VC switches 64, 94 via VP switches 70, 80.

A P2P tunnel comprises the software and hardware functionality necessary to implement a specific virtual UNI on the physical interface attached to the VP switch. Each P2P tunnel is assigned a unique VPI value. In addition, all the control, i.e., signaling, protocols associated with a specific P2P tunnel share the same VPI value and comprise their predefined VCI value. For example signaling utilizes VPI='tunnel VPI' and VCI=5. All the SVCs managed by a specific P2P tunnel utilize the same tunnel VPI. The control protocols for each tunnel communicate transparently with the peer VC switch control protocols via the VP switch network.

For illustration purposes, example VPI values for P2P PVP links 86, 88, 90 have been assigned and labeled as shown in FIG. 4. They are presented below in Table 6.

TABLE 6

VPI Values for P2P PVP Links 86, 88, 90

| P2P PVP Link | First Endpoint | Second Endpoint |
| --- | --- | --- |
| 86 (VC Switch 64, 82) | A | B |
| 88 (VC Switch 82, 94) | C | D |
| 90 (VC Switch 94, 64) | E | F |

In addition to the P2P PVP tunnels, a dedicated point to multipoint (P2M) VP tunnel is established and configured between the VC switch, i.e., the source, originating the multicast traffic to each of the other VC switches, i.e., all other destinations, connected to the public ATM network. The P2M VP tunnel is assigned a unique VPI value that is different from the VPI values used by the P2P VP tunnels.

In this example, a P2M PVP tunnel 92 is established between VC switch 82 and VC switches 64, 94. The P2M PVP tunnel is assigned VPI 'G' between the VC switch 82 and VP switch 68; VPI 'H' between VC switch 64 and VP switch 70; and VPI 'I' between VC switch 94 and VP switch 80.

A P2M tunnel comprises the software and hardware functionality necessary to handle multicast traffic on the physical interface attached to the VP switch. The P2M tunnel comprises a unique and different VPI value. No UNI control protocol traffic, however, is carried over the P2M tunnel. The P2M tunnel is used only for carrying user multicast traffic. All P2M SVCs managed by one of the P2P tunnels are assigned a VCI value from a shared pool of available VCIs. This prevents the assignment of the same VCI to two different P2M calls carried by the same common P2M connection.

For illustration purposes, example VPI values for P2M PVP connection 92 have been assigned and labeled as shown in FIG. 4. They are presented below in Table 7.

TABLE 7

VPI Values for P2M PVP Links 92

| P2M PVP Link | Origin Endpoint | Destination #1 | Destination #2 |
| --- | --- | --- | --- |
| 92(VC Switch 82, 94, 64) | G | H | I |

Figure 5:
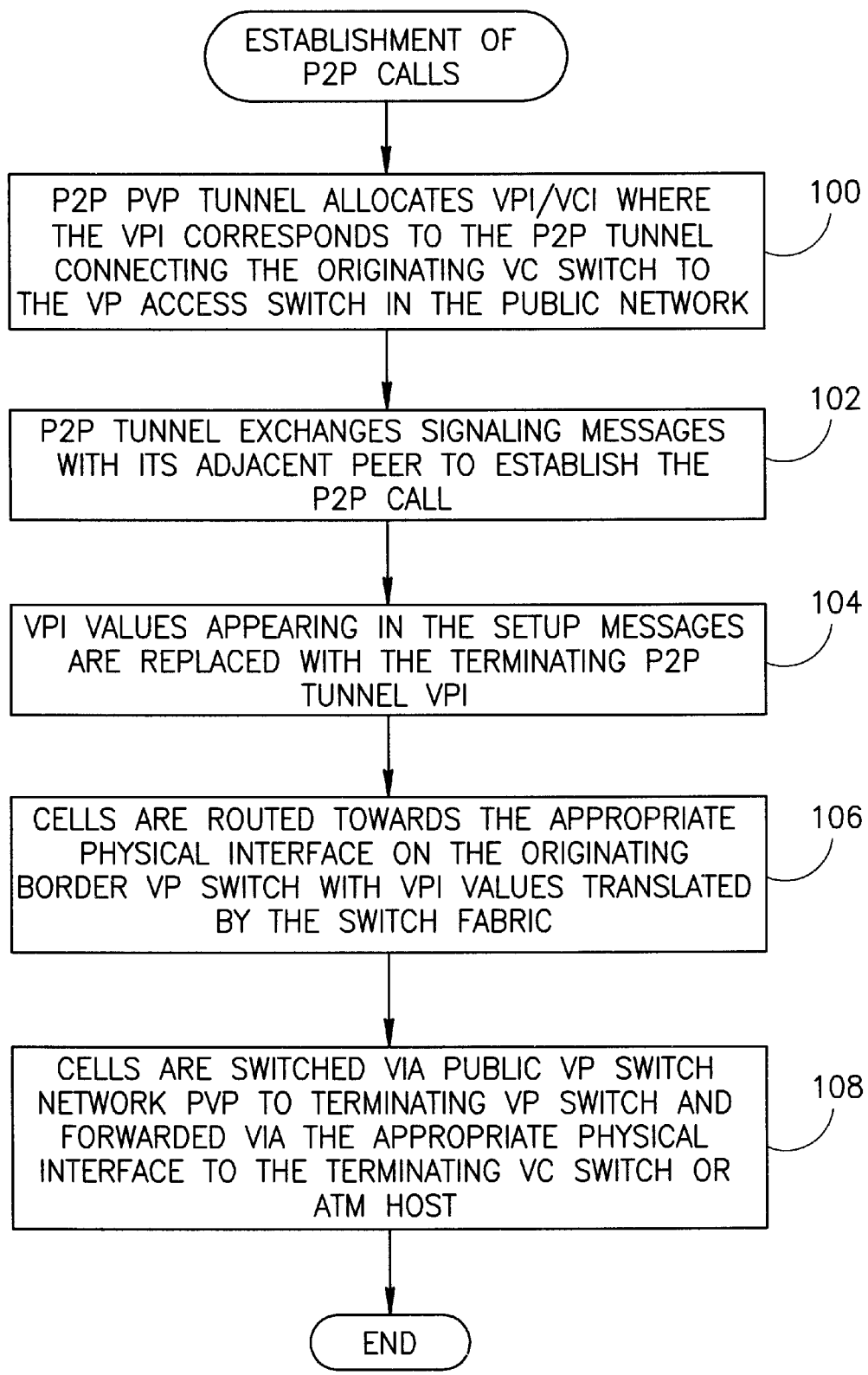
FIG. 5 is a flow diagram illustrating the method of establishing P2P calls utilizing VP tunneling in a public network.

The establishment of P2P and P2M calls will now be described in more detail with reference to FIGS. 4, 5 and 6. A flow diagram illustrating the method of establishing P2P calls utilizing VP tunneling in a public network is shown in FIG. 5. First, the P2P PVP tunnel allocates a VPI/VCI pair wherein the VPI value corresponds to the P2P tunnel connecting the originating VC switch to the access VP switch in the public network (step 100). Each of the three VC switches in the private networks establish P2P PVPs to their corresponding VP switches in the public network.

Signaling messages are exchanged over each P2P tunnel between each VC switch and its peer connected via the VP switch public network in order to establish the P2P call (step 102). The VPI values appearing in the SETUP messages are replaced with the VPI value corresponding to the connection between the peer VC switch and the VP switch connected to it (step 104).

Once the call is established, cells are routed towards the appropriate physical interface on the originating border VP switch with VPI values translated by the switch fabric (step 106). Cells are switched via the PVP through the public VP switch network to the terminating VC switch or ATM host and forwarded via the appropriate physical interface to the terminating VC switch or ATM host (step 108). In this fashion, P2P calls are established and the method terminates (referenced 'END' step).

Figure 6:
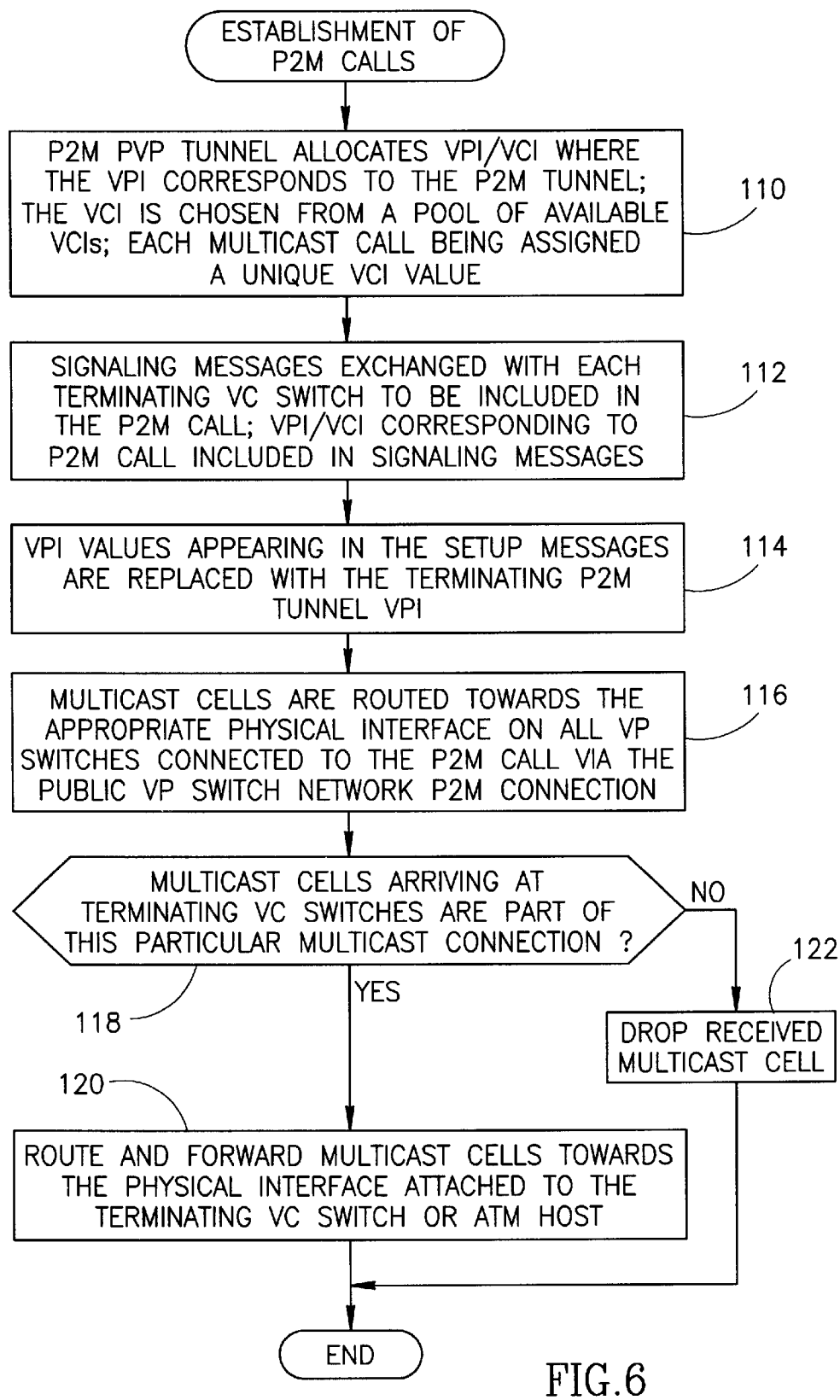
FIG. 6 is a flow diagram illustrating the method of establishing P2M calls utilizing VP tunneling in a public network.

A flow diagram illustrating the method of establishing P2M calls utilizing VP tunneling in a public network is shown in FIG. 6. For each multicast connection to be established, a VPI/VCI value pair is allocated over the dedicated P2M VP tunnel (step 110). The VPI value corresponds to the P2M tunnel and the VCI is chosen from a shared pool of available VCIs. Each multicast call is assigned a unique VCI value.

The VPI/VCI pair assigned on the P2M VP tunnel is used to transmit the data associated with the multicast call. The P2M tunnel is used to transmit data associated with all P2M calls for all the P2P VP tunnels carried by the physical interface. Note that no control layer messages are exchanged over the P2M VP tunnel.

In accordance with present invention, the allocation of VPI/VCI pairs is preferably performed in a centralized manner such that the VPI value assigned is equal to the corresponding VPI of the P2M VP tunnel and the VCI is allocated from a shared pool of available VCI values for all P2P tunnels.

Signaling messages are exchanged with each terminating, i.e., destination, VC switch to be included in the P2M call (step 112). The VPI/VCI corresponding to the P2M call is incorporated in the signaling messages. The VPI values appearing in the SETUP messages are replaced with the VPI value corresponding to the terminating P2M tunnel VPI (step 114). A registration process occurs whereby each destination VC switch to be included in a particular multicast call is configured to accept multicast cells arriving there having a VPI/VCI matching one previously registered. The well known ATM SETUP signaling message can be used to register a destination VC switch for a multicast call. The SETUP message would include the VCI assigned from the pool of available VCI values.

Once the call is established, multicast cells are routed towards the appropriate physical interface on all VP switches connected to the P2M call via the public VP switch network P2M PVP (step 116).

In accordance with the present invention, all multicast traffic is received by all destination VC ATM switches on the P2M call since it is not possible to define a subset of sites for the multicast traffic. Therefore, each VC ATM switch is operative to filter out the non-relevant multicast traffic received over the physical interface attached to the ATM VP switch in the public network by checking if multicast cells arriving at a terminating VC switch are part of this particular multicast connection (step 118). The multicast call is established first by sending the appropriate signaling messages over the P2P tunnels from the multicast sender to each VC switch to be included in this particular multicast call. The signaling messages convey the VPI/VCI assigned to the multicast call to be established.

When multicast traffic arrives at a VC switch, its VPI/VCI tag is examined to determine if multicast cells arriving at a terminating VC switch are part of this particular multicast connection. If the tag was previously registered with the VC switch as a destination a multicast call, the cell is routed and forwarded toward the physical interface attached to the terminating VC switch or ATM host (step 120). If the tag is not found, i.e., was not previously registered with the VC switch as a destination multicast call, the multicast cell is dropped (step 122). In this fashion, P2M calls are established and the method terminates (referenced 'END' step).

In accordance with the present invention, there may be more than one multicast call established over the same P2M PVP tunnel. Further, there may be more than one P2M PVP tunnel established. The P2M PVP tunnels may be established from the same source VC switch or from many different VC switches. In this case, each VC switch is adapted to identify the different P2M PVP tunnels connected to it.

While the invention has been described with respect to a limited number of embodiments, it will be appreciated that many variations, modifications and other applications of the invention may be made.

What is claimed is:

1. In an Asynchronous Transfer Mode (ATM) network) a method of establishing multicast connections from a multicast source Virtual Circuit (VC) switch to a plurality of multicast destination VC switches, said source VC switch and said plurality of destination VC switches connected to a public ATM Virtual Path (VP) switched network, said method comprising the steps of:

establishing a plurality of point to point (P2P) permanent virtual path (PVP) tunnels, a separate P2P PVP tunnel established from said multicast source VC switch to each multicast destination VC switch, each P2P PVP tunnel being assigned a unique VPI value;

establishing a point to multipoint (P2M) PVP tunnel between said multicast source VC switch and each multicast destination VC switch, said P2M PVP tunnel assigned a unique VPI value different from VPI values assigned to said plurality of P2P tunnels;

assigning a VPI/VCI value to each multicast call to be established wherein the VPI value corresponds to the VPI value assigned to said P2M PVP tunnel, the VCI value assigned being unique for all multicast calls to be carried over said P2M PVP tunnel;

registering each multicast call with one or more multicast destination VC switches intended to be included in said multicast call; and transmitting multicast traffic of all P2M calls carried by the physical interface associated therewith from said multicast source VC switch via said P2M PVP tunnel;

filtering multicast cells at each multicast destination VC switch in accordance with multicast calls previously registered therewith.

2. The method according to claim 1, wherein said P2M PVP tunnel is adapted to carry only multicast traffic and no signaling or control messages.

3. The method according to claim 1, wherein said step of assigning comprises assigning VCI values from a shared pool of available VCI values.

4. The method according to claim 1, wherein said step of registering comprises the exchange of signaling messages between said multicast source VC switch and each multicast destination VC switch over said public VP switched network.

* * * * *